United States Patent [19]

Cary

[11] Patent Number: 5,119,114
[45] Date of Patent: Jun. 2, 1992

[54] METHOD AND APPARATUS FOR CENTERING ALIGNING AND ATTACHING CARRIAGE SHAFTS IN A PEN PLOTTER

[75] Inventor: Paul D. Cary, Orange, Calif.

[73] Assignee: Calcojmp Inc., Anaheim, Calif.

[21] Appl. No.: 694,561

[22] Filed: May 2, 1991

[51] Int. Cl.⁵ .................... G01D 15/00; B41J 11/22
[52] U.S. Cl. .................. 346/139 R; 346/139 C; 400/354
[58] Field of Search ........... 361/139 A, 139 B, 139 C, 361/139 R; 400/354

[56] References Cited

U.S. PATENT DOCUMENTS

| | | | |
|---|---|---|---|
| 4,517,576 | 5/1985 | Sugawara | 346/139 R |
| 4,547,089 | 10/1985 | Jung et al. | 400/354 |

*Primary Examiner*—Benjamin R. Fuller
*Assistant Examiner*—Gerald E. Preston
*Attorney, Agent, or Firm*—Donald A. Streck; Wm. F. Porter, Jr.

[57] ABSTRACT

This invention is directed to a method and associated apparatus for allowing the carriage shafts of a pen plotter to be mounted and aligned quickly and accurately without the introduction of any bending stresses or intra-shaft misalignment. The shafts have conical indentations in the ends thereof. Laterally slidable end caps are bolted over the shaft ends and bolted in place in proper alignment with the shafts. An end cap on one end of the shafts has conical projections in the bottoms of bores therein aligned with and fitting into the shaft ends. An end cap on the other end of the shafts has bolts with conical ends threaded through the bottoms of bores therein aligned with and fitting into the shaft ends. The bolts through the end cap are tightened to hold the shafts in place. An alignment fixture holds the shafts in proper alignment while the end caps are aligned and tightened.

19 Claims, 3 Drawing Sheets

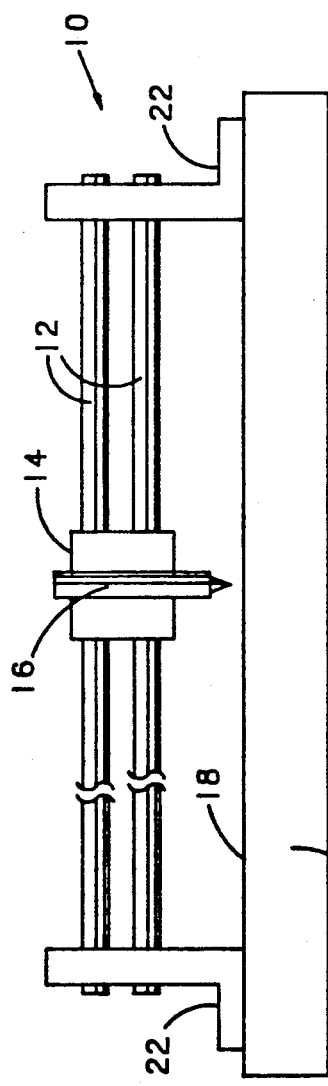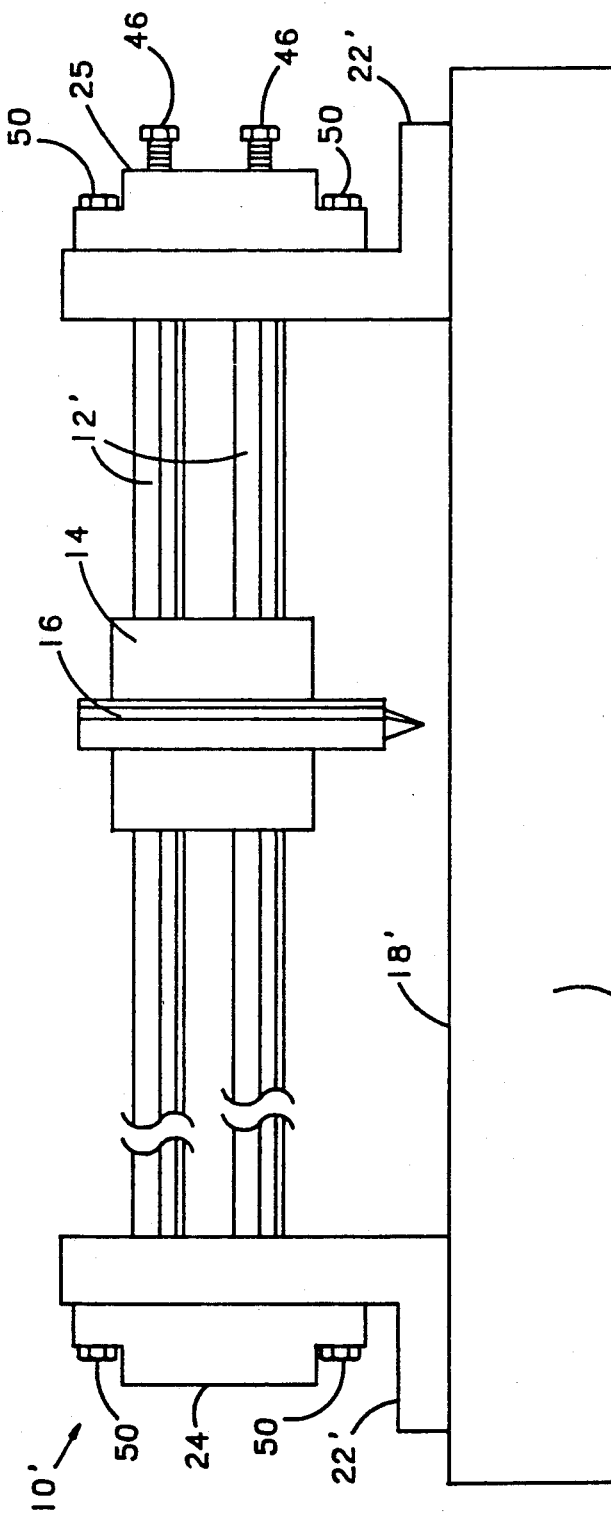
FIG. 1 PRIOR ART
FIG. 2

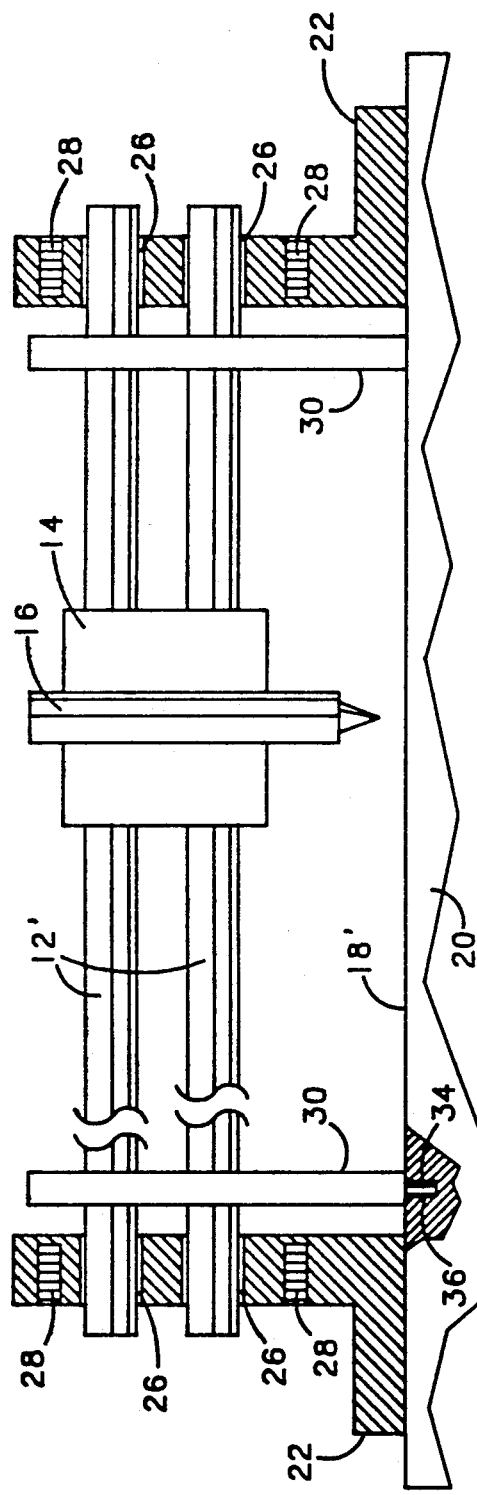
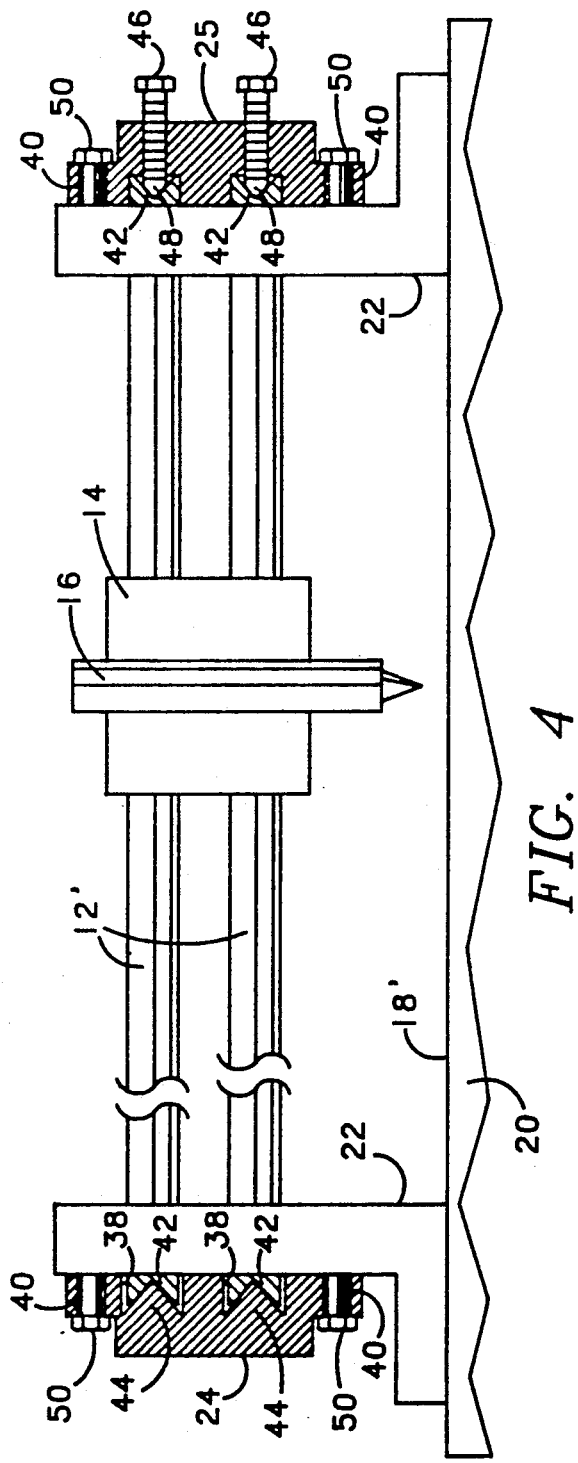

METHOD AND APPARATUS FOR CENTERING ALIGNING AND ATTACHING CARRIAGE SHAFTS IN A PEN PLOTTER

Background of the Invention

The present invention relates to pen plotters, and the like, and, more particularly, to a method and associated apparatus for allowing the carriage shafts of a pen plotter to be mounted and aligned quickly and accurately without the introduction of any bending stresses or intra-shaft mis-alignment.

In a prior art pen plotter as partially depicted in FIG. 1, the plotter 10 includes a pair of carriage shafts 12 which slidably support a pen carriage 14 carrying a pen 16 over a primary platen 18 carried by the top of a structural boom 20. The carriage shafts 12 are supported on their ends by the vertical end members 22. Where there is no interaction between the pen carriage 14 and the primary platen 18 other than the pen 16 being lowered to contact a plotting media (not shown), the alignment of the carriage shafts 12 is not so critical as to present a problem. On the other hand, in a more technically advanced pen plotter as are now becoming available wherein there is interaction between the pen carriage 14 and the primary platen 18 for paper alignment, self-calibration, and the like, the alignment of the carriage shafts 12 with respect to the primary platen 18 and any grooves or other interactive portions thereof employed for the above-described features becomes of critical importance.

As those skilled in the art readily recognize and appreciate, it is one thing for an engineer to design equipment and yet another to be able to manufacture it within cost-to-produce limitations. Part tolerance plays a critical part in this process. Designating dimensions with a tolerance of plus or minus zero is simply not possible or practical. The machining of parts introduces tolerance errors and that is a fact of life that must be accounted for in manufacturing processes. In a small plotter 10 having relatively short carriage shafts 14 and low tolerance requirements in the finished product, the carriage shafts 14 could be inserted into receiving bores provided therefor in the vertical end supports 22, shifted from end-to-end to align them, and then set screws in the vertical end supports 22 communicating with the receiving bores tightened to hold them in place. Oversized bores for attachment bolts (not shown) holding the vertical end supports 22 to the primary platen 18 provided an additional degree of adjustment freedom in both the fore and aft and side to side directions as FIG. 1 is viewed. With longer carriage shafts 12 and close tolerance requirements imposed on the final product, the above-described "set screw" approach simply will not work. Accurate alignment becomes labor intensive at best and bending stresses and mis-alignment between the two carriage shafts is easily introduced.

Wherefore, it is the object of the present invention to provide a method and associated apparatus for allowing the carriage shafts of a pen plotter to be mounted and aligned quickly and accurately without the introduction of any bending stresses or intra-shaft mis-alignment.

Other objects and benefits of the invention will become apparent from the detailed description which follows hereinafter when taken in conjunction with the drawing figures which accompany it.

Summary

The foregoing object has been attained in a device requiring that a shaft supported between a pair of end supports perpendicularly attached to a bed be accurately positioned with respect to the bed, by the shaft end holding apparatus of the present invention for permitting rapid and accurate assembly of the device comprising, a pair of first alignment means carried by respective ends of the shaft; a pair of first clearance bores with respect to a diameter of the shaft through respective ones of the end supports with the respective ends of the shaft disposed therethrough; a first end cap having second alignment means therein concentrically aligned with one of the first clearance bores, the second alignment means being engaged with one of the pair of first alignment means for holding a first end of the shaft in alignment; first attachment means for attaching the first end cap to one of the pair of end supports; a second end cap having third alignment means therein concentrically aligned with another of the first clearance bores, the third alignment means being engaged with another of the pair of first alignment means for holding a second end of the shaft in alignment; and, second attachment means for attaching the second end cap to another of the pair of end supports.

In the preferred embodiment, the first alignment means comprises conical indentations concentrically formed in respective ends of the shaft; the second alignment means comprises the first end cap having a non-through second clearance bore therein concentrically aligned with one of the first clearance bores, the second clearance bore having a conical projection concentrically disposed at a bottom thereof engaging one of the conical indentations; and, the third alignment means comprises the second end cap having a non-through second clearance bore therein concentrically aligned with another of the first clearance bores, the second clearance bore having a bolt with a conical end concentrically threaded therethrough at a bottom thereof with the conical end engaging another of the conical indentations.

The preferred embodiment also includes alignment fixture means for holding the shaft in alignment with respect to the bed and the end supports while the shaft end holding apparatus is attached to the end supports, aligned with respect to the shaft, and tightened. The preferred alignment fixture means comprises a pair of base members each having alignment pins projecting therefrom and a holding member extending perpendicular therefrom; alignment bores in the bed positioned to receive the pins and place the holding members in proper alignment with respect to the bed; and, holding means included within each of the holding members for holding the shaft in proper alignment with respect to the bed.

DESCRIPTION OF THE DRAWINGS

FIG. 1 is a simplified front elevation of the portions of a pen plotter to which the present invention applies for a prior art pen plotter.

FIG. 2 is a simplified front elevation of the same portions of a pen plotter as in FIG. 1 for a pen plotter according to the present invention.

FIG. 3 is a partially cutaway front elevation of the pen plotter of FIG. 2 with the alignment fixture in place and the end caps removed.

FIG. 4 is a partially cutaway front elevation of the pen plotter of FIG. 2 with the alignment fixture removed and the end caps in place.

DESCRIPTION OF THE PREFERRED EMBODIMENT

The significant portions of a plotter 10' according to the present invention are shown assembled in FIG. 2. The components which are the same as those in FIG. 1 are labelled with like numbers and those which are substantially the same as those in FIG. 1 are labelled with like numbers followed by a prime ('). The plotter 10' includes a pair of carriage shafts 12' which slidably support a pen carriage 14 carrying a pen 16 over a primary platen 18' carried by the top of a structural boom 20. The carriage shafts 12' are supported on their ends by a pair of end caps 24, 25 attached to the vertical end members 22'. Thus, it will be readily recognized and understood that it is the supporting end caps 24, 25 which are the totally new aspect of the assembled plotter 10' and the remaining "primed" components are only modified in a way which will be described in detail hereinafter so as to interact with the end caps 24, 25 and the improved method of assembly, which will also now be described.

Figure 5:
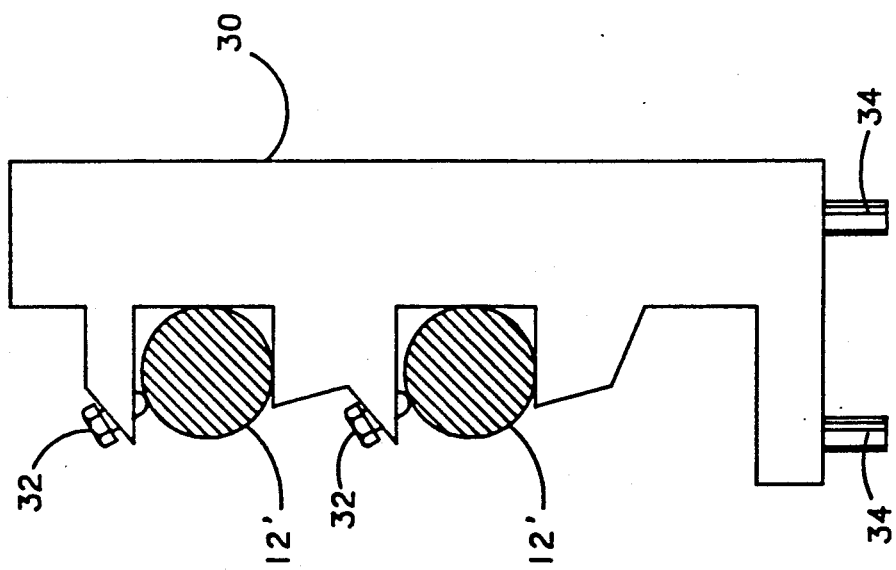
FIG. 5 is a partially cutaway side elevation of the pen plotter of FIG. 3 showing how the alignment fixture works.

As can be seen from the cutaway view of FIG. 3, the vertical end members 22' are modified by having the bores 26 therethrough through which the carriage shafts 12' pass be oversized in diameter with respect to the diameter of the carriage shafts 12' and by the addition of threaded bores 28 therein, which will be described in greater detail shortly. In assembling the plotter 10' according to this invention, the two carriage shafts 12' are placed in a pair of alignment fixtures 30 in the manner depicted in FIGS. 3 and 5 and held in place in parallel and longtudinal alignment and position thereby by the temporary tightening of the bolts 32. The alignment fixtures 30 are properly positioned by inserting a pair of pins 34 on the bottoms thereof into bores 36 placed in the primary platen 18' therefor during the manufacture thereof. The two carriage shafts 12' are thus accurately positioned with the ends thereof within and passing through the bores 26; but, without any pressure thereon due to the oversized nature of the bores 26 as mentioned above and as pictured in FIG. 6. Note also that at this point, the vertical end members 22' have been securely bolted in place onto the primary platen 18' in the usual manner.

Figure 6:
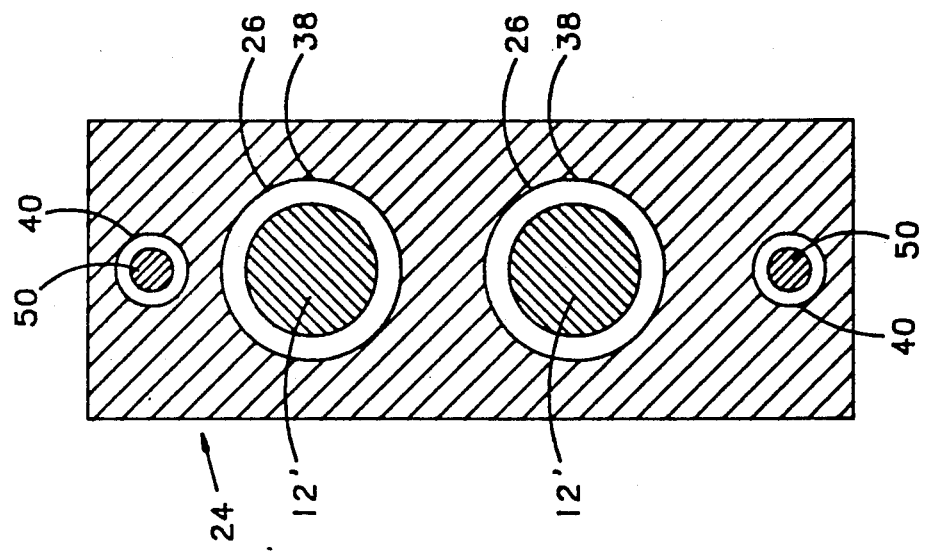
FIG. 6 is a cutaway side view of the pen plotter of FIG. 2 through one of the end caps.

The two carriage shafts 12' are next fastened securely into their thus accurately aligned position with respect to the primary platen 18' (and any required grooves, etc. thereon) by the addition of the end caps 24, 25 as depicted in FIGS. 4 and 6. Both end caps 24, 25 have clearance bores 38 therein of substantially the same diameter as the bores 36 in the vertical end members 22'. As can be seen and as will be described shortly, the bores 38 are not through bores, however. Both end caps 24, 25 also have a pair of through bores 40 at top and bottom portions thereof concentrically spaced with respect to the threaded bores 28 in the vertical end members 22' (described earlier) when the bores 38 are concentrically aligned with the bores 26.

For purposes of the present invention, the carriage shafts 12' have been modified only by the addition of conical indentations 42 concentrically formed into the ends thereof. One end cap 24 has conical projections 44 to match the conical indentations 42 concentrically disposed at the bottom of the bores 38 thereof. The other end cap 25 has bolts 46 with conically shaped ends 48 to match the conical indentations 42 concentrically threaded through the bottom of the bores 38 thereof. With the carriage shafts 12' held in alignment by the alignment fixture 30 as described above, the one end cap 24 is slidably attached to its vertical end member 22' by means of bolts 50 passing through the bores 40 and into threaded engagement with the threaded bores 28. The end cap 24 is slid into longitudinal alignment with the two carriage shafts 12' by moving the oversized bores 40 about the bolts 50. Once the end cap 24 is in alignment, the bolts 50 are tightened to hold it in place. The other end cap 25 is then slidably attached to its vertical end member 22' by means of a second set of bolts 50 passing through the bores 40 thereof and into threaded engagement with the threaded bores 28 of its vertical end member 22'. The end cap 25 is also slid into longitudinal alignment with the two carriage shafts 12' by moving the oversized bores 40 about the bolts 50. Once the end cap 24 is in alignment, the bolts 50 are tightened to hold it in place. The bolts 46 are then tightened to hold the two carriage shafts 12' firmly pinched between the conical projections 44 and conically shaped ends 48 fit into their respective conical indentations 42. At that point, the assembly process is complete and the alignment fixture 30 is removed. As those skilled in the art will readily recognize and appreciate, the alignment fixture 30 as pictured herein is shown in simplified form to depict its functional aspects only and provision must be made therein to release it from the carriage shafts 12' and the bores 36 holding the pins 34 so that it can be removed following the above-described assembly process.

While a pen plotter having a pair of carriage shafts has been employed by way of example in the foregoing description and accompanying drawing figures, those skilled in the art will readily recognize that the methods and apparatus hereof could be employed to advantage in other apparatus requiring precision assembly and to apparatus employing only one shaft or more than two shafts.

Wherefore, having thus described the present invention, what is claimed is:

1. A shaft end holding apparatus to permit rapid and accurate assembly of a device requiring that a shaft supported between a pair of end supports perpendicularly attached to a bed be accurately positioned with respect to the bed, comprising:
    a) conical indentations concentrically formed in respective ends of the shaft;
    b) a pair of first clearance bores with respect to a diameter of the shaft through respective ones of the end supports with said respective ends of the shaft disposed therethrough;
    c) a pair of threaded bores concentrically disposed on opposite sides of each of said pair of first clearance bores;
    d) two pairs of bolts sized to threadedly engage respective ones of said threaded bores;
    e) a first end cap having a non-through second clearance bore therein concentrically aligned with one of said first clearance bores and a pair of third clearance bores with respect to said bolts therethrough disposed on opposite sides of said second clearance bore and concentrically aligned with respective ones of said pair of threaded bores, said second clearance bore having a conical projection concentrically disposed at a bottom thereof engaging one of said conical indentations, one of said two pair of bolts being disposed through respective ones of said pair of third clearance bores and threadedly engaged with respective ones of a pair of said threaded bores; and, f) a second end cap having a non-through second clearance bore therein concentrically aligned with another of said first clearance bores and a pair of third clearance bores with respect to said bolts therethrough disposed on opposite sides of said second clearance bore and concentrically aligned with respective ones of said pair of threaded bores, said second clearance bore having a bolt with a conical end concentrically threaded therethrough at a bottom thereof with said conical end engaging another of said conical indentations, another of said two pair of bolts being disposed through respective ones of said pair of third clearance bores and threadedly engaged with respective ones of another pair of said threaded bores.

2. The shaft end holding apparatus of claim 1 and additionally comprising:

alignment fixture means for holding the shaft in alignment with respect to the bed and the end supports while the shaft end holding apparatus is attached to the end supports, aligned with respect to the shaft, and tightened.

3. The shaft end holding apparatus of claim 2 wherein:

a) said alignment fixture means comprises a pair of base members each having alignment pins projecting therefrom and a holding member extending perpendicular therefrom;

b) alignment bores in the bed positioned to receive said pins and place said holding members in proper alignment with respect to the bed; and, c) holding means included within each of said holding members for holding the shaft in proper alignment with respect to the bed.

4. In a device requiring that a shaft supported between a pair of end supports perpendicularly attached to a bed be accurately positioned with respect to the bed, shaft end holding apparatus to permit rapid and accurate assembly of the device comprising:

a) a pair of first alignment means carried by respective ends of the shaft;

b) a pair of first clearance bores with respect to a diameter of the shaft through respective ones of the end supports with said respective ends of the shaft disposed therethrough;

c) a pair of threaded bores concentrically disposed on opposite sides of each of said pair of first clearance bores;

d) two pairs of bolts sized to threadedly engage respective ones of said threaded bores;

e) a first end cap having second alignment means therein concentrically aligned with one of said first clearance bores and a pair of third clearance bores with respect to said bolts therethrough disposed on opposite sides of said second alignment means and concentrically aligned with respective ones of said pair of threaded bores, said second alignment means being engaged with one of said pair of first alignment means for holding a first end of the shaft in alignment, one of said two pair of bolts being disposed through respective ones of said pair of third clearance bores and threadedly engaged with respective ones of one pair of said threaded bores; and, f) a second end cap having third alignment means therein concentrically aligned with another of said first clearance bores and a pair of third clearance bores with respect to said bolts therethrough disposed on opposite sides of said second alignment means and concentrically aligned with respective ones of said pair of threaded bores, said third alignment means being engaged with another of said pair of first alignment means for holding a second end of the shaft in alignment, another of said two pair of bolts being disposed through respective ones of said pair of third clearance bores and threadedly engaged with respective ones of another pair of said threaded bores.

5. The shaft end holding apparatus of claim 4 wherein:

a) said first alignment means comprises conical indentations concentrically formed in respective ends of the shaft;

b) said second alignment means comprises said first end cap having a non-through second clearance bore therein concentrically aligned with one of said first clearance bores and a pair of third clearance bores with respect to said bolts therethrough disposed on opposite sides of said second clearance bore and concentrically aligned with respective ones of said pair of threaded bores, said second clearance bore having a conical projection concentrically disposed at a bottom thereof engaging one of said conical indentations; and, c) said third alignment means comprises said second end cap having a non-through second clearance bore therein concentrically aligned with another of said first clearance bores and a pair of third clearance bores with respect to said bolts therethrough disposed on opposite sides of said second clearance bore and concentrically aligned with respective ones of said pair of threaded bores, said second clearance bore having a bolt with a conical end concentrically threaded therethrough at a bottom thereof with said conical end engaging another of said conical indentations.

6. The shaft end holding apparatus of claim 4 and additionally comprising:

alignment fixture means for holding the shaft in alignment with respect to the bed and the end supports while the shaft end holding apparatus is attached to the end supports, aligned with respect to the shaft, and tightened.

7. The shaft end holding apparatus of claim 6 wherein:

a) said alignment fixture means comprises a pair of base members each having alignment pins projecting therefrom and a holding member extending perpendicular therefrom;

b) alignment bores in the bed positioned to receive said pins and place said holding members in proper alignment with respect to the bed; and, c) holding means included within each of said holding members for holding the shaft in proper alignment with respect to the bed.

8. A shaft end holding apparatus to permit rapid and accurate assembly of a device including a pair of parallel shafts supported between a pair of end supports perpendicularly attached to a bed and accurately positioned with respect to the bed, comprising:
   a) a plurality of first alignment means carried by respective ends of the shafts;
   b) a pair of first clearance bores with respect to a diameter of the shafts through each of the end supports with respective ends of the shafts disposed therethrough;
   c) a pair of threaded bores concentrically disposed on opposite sides of each pair of first clearance bores;
   d) two pairs of bolts sized to threadedly engage respective ones of said threaded bores;
   e) a first end cap having second alignment means therein concentrically aligned with one pair of said first clearance bores and a pair of third clearance bores with respect to said bolts therethrough disposed on opposite sides of said second alignment means and concentrically aligned with respective ones of said pair of threaded bores, said second alignment means being engaged with a first of said first alignment means for holding first ends of the shafts in alignment, one of said two pair of bolts being disposed through respective ones of said pair of third clearance bores and threadedly engaged with respective ones of one pair of said threaded bores; and,
   f) a second end cap having third alignment means therein concentrically aligned with another pair of said first clearance bores and a pair of third clearance bores with respect to said bolts therethrough disposed on opposite sides of said second alignment means and concentrically aligned with respective ones of said pair of threaded bores, said third alignment means being engaged with a second of said first alignment means for holding second ends of the shafts in alignment, another of said two pair of bolts being disposed through respective ones of said pair of third clearance bores and threadedly engaged with respective ones of another pair of said threaded bores.

9. The shaft end holding apparatus of claim 8 wherein:
   a) said first alignment means comprises conical indentations concentrically formed in respective ends of the shafts;
   b) said second alignment means comprises said first end cap having a pair of non-through second clearance bores therein concentrically aligned with ones of said first clearance bores and a pair of third clearance bores with respect to said bolts therethrough disposed on opposite sides of said second clearance bores and concentrically aligned with respective ones of said pair of threaded bores, said second clearance bores having conical projections concentrically disposed at respective bottoms thereof engaging ones of said conical indentations; and,
   c) said third alignment means comprises said second end cap having a pair of non-through second clearance bores therein concentrically aligned with others of said first clearance bores and a pair of third clearance bores with respect to said bolts therethrough disposed on opposite sides of said second clearance bores and concentrically aligned with respective ones of said pair of threaded bores, said second clearance bores having bolts with conical ends concentrically threaded therethrough at respective bottoms thereof with said conical ends engaging others of said conical indentations.

10. The shaft end holding apparatus of claim 8 and additionally comprising:
    alignment fixture means for holding the shafts in alignment with respect to the bed and the end supports while the shaft end holding apparatus is attached to the end supports, aligned with respect to the shafts, and tightened.

11. The shaft end holding apparatus of claim 10 wherein:
    a) said alignment fixture means comprises a pair of base members each having alignment pins projecting therefrom and a holding member extending perpendicular therefrom;
    b) alignment bores in the bed positioned to receive said pins and place said holding members in proper alignment with respect to the bed; and,
    c) holding means included within each of said holding members for holding the shafts in proper alignment with respect to the bed.

12. A shaft end holding apparatus to permit rapid and accurate assembly of a pen plotter including a pair of parallel carriage shafts supported between a pair of end supports perpendicularly attached to a primary platen and accurately positioned with respect to the primary platen, comprising:
    a) a plurality of first alignment means carried by respective ends of the carriage shafts;
    b) a pair of first clearance bores with respect to a diameter of the carriage shafts through each of the end supports with respective ends of the carriage shafts disposed therethrough;
    c) a pair of threaded bores concentrically disposed on opposite sides of each pair of first clearance bores;
    d) two pairs of bolts sized to threadedly engage respective ones of said threaded bores;
    e) a first end cap having second alignment means therein concentrically aligned with one pair of said first clearance bores and a pair of third clearance bores with respect to said bolts therethrough disposed on opposite sides of said second alignment means and concentrically aligned with respective ones of said pair of threaded bores, said second alignment means being engaged with a first of said first alignment means for holding first ends of the carriage shafts in alignment, one of said two pair of bolts being disposed through respective ones of said pair of third clearance bores and threadedly engaged with respective ones of one pair of said threaded bores; and,
    f) a second end cap having third alignment means therein concentrically aligned with another pair of said first clearance bores and a pair of third clearance bores with respect to said bolts therethrough disposed on opposite sides of said second alignment means and concentrically aligned with respective ones of said pair of threaded bores, said third alignment means being engaged with a second of said first alignment means for holding second ends of the carriage shafts in alignment, another of said two pair of bolts being disposed through respective ones of said pair of third clearance bores and threadedly engaged with respective ones of another pair of said threaded bores.

13. The shaft end holding apparatus of claim 12 wherein:
   a) said first alignment means comprises conical indentations concentrically formed in respective ends of the carriage shafts;
   b) said second alignment means comprises said first end cap having a pair of non-through second clearance bores therein concentrically aligned with ones of said first clearance bores and a pair of third clearance bores with respect to said bolts therethrough disposed on opposite sides of said second clearance bores and concentrically aligned with respective ones of said pair of threaded bores, said second clearance bores having conical projections concentrically disposed at respective bottoms thereof engaging ones of said conical indentations; and,
   c) said third alignment means comprises said second end cap having a pair of non-through second clearance bores therein concentrically aligned with others of said first clearance bores and a pair of third clearance bores with respect to said bolts therethrough disposed on opposite sides of said second clearance bores and concentrically aligned with respective ones of said pair of threaded bores, said second clearance bores having bolts with conical ends concentrically threaded therethrough at respective bottoms thereof with said conical ends engaging others of said conical indentations.

14. The shaft end holding apparatus of claim 12 and additionally comprising:
   alignment fixture means for holding the carriage shafts in alignment with respect to the primary platen and the end supports while the shaft end holding apparatus is attached to the end supports, aligned with respect to the carriage shafts, and tightened.

15. The shaft end holding apparatus of claim 14 wherein:
   a) said alignment fixture means comprises a pair of base members each having alignment pins projecting therefrom and a holding member extending perpendicular therefrom;
   b) alignment bores in the primary platen positioned to receive said pins and place said holding members in proper alignment with respect to the primary platen; and,
   c) holding means included within each of said holding members for holding the carriage shafts in proper alignment with respect to the primary platen.

16. In a device requiring that a shaft supported between a pair of end supports perpendicularly attached to a bed be accurately positioned with respect to the bed, shaft end holding apparatus to permit rapid and accurate assembly of the device comprising:
   a) a pair of first alignment means carried by respective ends of the shaft;
   b) a pair of first clearance bores with respect to a diameter of the shaft through respective ones of the end supports with said respective ends of the shaft disposed therethrough;
   c) a first end cap having second alignment means therein concentrically aligned with one of said first clearance bores, said second alignment means being engaged with one of said pair of first alignment means for holding a first end of the shaft in alignment;
   d) first attachment means for attaching said first end cap to one of the pair of end supports;
   e) a second end cap having third alignment means therein concentrically aligned with another of said first clearance bores, said third alignment means being engaged with another of said pair of first alignment means for holding a second end of the shaft in alignment; and,
   f) second attachment means for attaching said second end cap to another of the pair of end supports.

17. The shaft end holding apparatus of claim 16 wherein:
   a) said first alignment means comprises conical indentations concentrically formed in respective ends of the shaft;
   b) said second alignment means comprises said first end cap having a non-through second clearance bore therein concentrically aligned with one of said first clearance bores, said second clearance bore having a conical projection concentrically disposed at a bottom thereof engaging one of said conical indentations; and,
   c) said third alignment means comprises said second end cap having a non-through second clearance bore therein concentrically aligned with another of said first clearance bores, said second clearance bore having a bolt with a conical end concentrically threaded therethrough at a bottom thereof with said conical end engaging another of said conical indentations.

18. The shaft end holding apparatus of claim 17 and additionally comprising:
   alignment fixture means for holding the shaft in alignment with respect to the bed and the end supports while the shaft end holding apparatus is attached to the end supports, aligned with respect to the shaft, and tightened.

19. The shaft end holding apparatus of claim 18 wherein:
   a) said alignment fixture means comprises a pair of base members each having alignment pins projecting therefrom and a holding member extending perpendicular therefrom;
   b) alignment bores in the bed positioned to receive said pins and place said holding members in proper alignment with respect to the bed; and,
   c) holding means included within each of said holding members for holding the shaft in proper alignment with respect to the bed.

* * * * *

UNITED STATES PATENT AND TRADEMARK OFFICE
CERTIFICATE OF CORRECTION

PATENT NO. : 5,119,114

DATED : June 2, 1992

INVENTOR(S) : Paul D. Cary

It is certified that error appears in the above-indentified patent and that said Letters Patent is hereby corrected as shown below:

On the title page item [73]
Assignee should be CalComp, Inc.

Signed and Sealed this

Twenty-third Day of November, 1993

Attest:

BRUCE LEHMAN

Attesting Officer     Commissioner of Patents and Trademarks